United States Patent

[11] 3,569,968

| [72] | Inventor | Roger Ross Love<br>89 Brooklake Road, Florham Park, N.J. 07932 |
|---|---|---|
| [21] | Appl. No. | 767,361 |
| [22] | Filed | Oct. 14, 1968 |
| [45] | Patented | Mar. 9, 1971 |

[54] PROXIMITY INDICATING MEANS
13 Claims, 8 Drawing Figs.

[52] U.S. Cl. ............................................. 343/100,
343/112, 343/180, 325/21
[51] Int. Cl. .......................................... H04b 7/00,
G08g 5/04
[50] Field of Search ................................. 325/21;
343/100, 112.4, 175, 180

[56] References Cited
UNITED STATES PATENTS

| 524,994 | 8/1894 | Allen | 112/149 |
|---|---|---|---|
| 645,539 | 3/1900 | Allen | 112/149 |
| 770,678 | 9/1904 | Cunningham | 112/149 |
| 1,559,267 | 10/1925 | Lipshitz | 112/20X |
| 2,082,738 | 6/1937 | Vesconte | 112/218 |
| 2,423,996 | 7/1947 | Rubel | 112/218 |
| 2,588,281 | 3/1952 | Olday | 112/20 |
| 2,730,056 | 1/1956 | Wiesenfeld | 112/20 |
| 2,827,867 | 3/1958 | Happe | 112/218X |
| 2,886,796 | 5/1959 | Wallace | 343/112(.4)UX |
| 3,183,508 | 5/1965 | Curry | 343/180UX |

*Primary Examiner*—Rodney D. Bennett, Jr.
*Assistant Examiner*—T.H. Tubbesing

ABSTRACT: A proximity indicating system having an RF transmitter, a normally balanced differential circuit, a tuned antenna circuit, and indicating means. The continuously transmitted signal is applied to the antenna in such a manner as to maintain the differential circuit in a balanced condition, while simultaneously received signals of the same frequency coming from other systems within operating range cause an unbalance in the differential circuit which is detected by the indicator. When the system is used with aircraft, the transmitter may be frequency modulated and the antenna circuit tuned in accordance with the aircraft altitude.

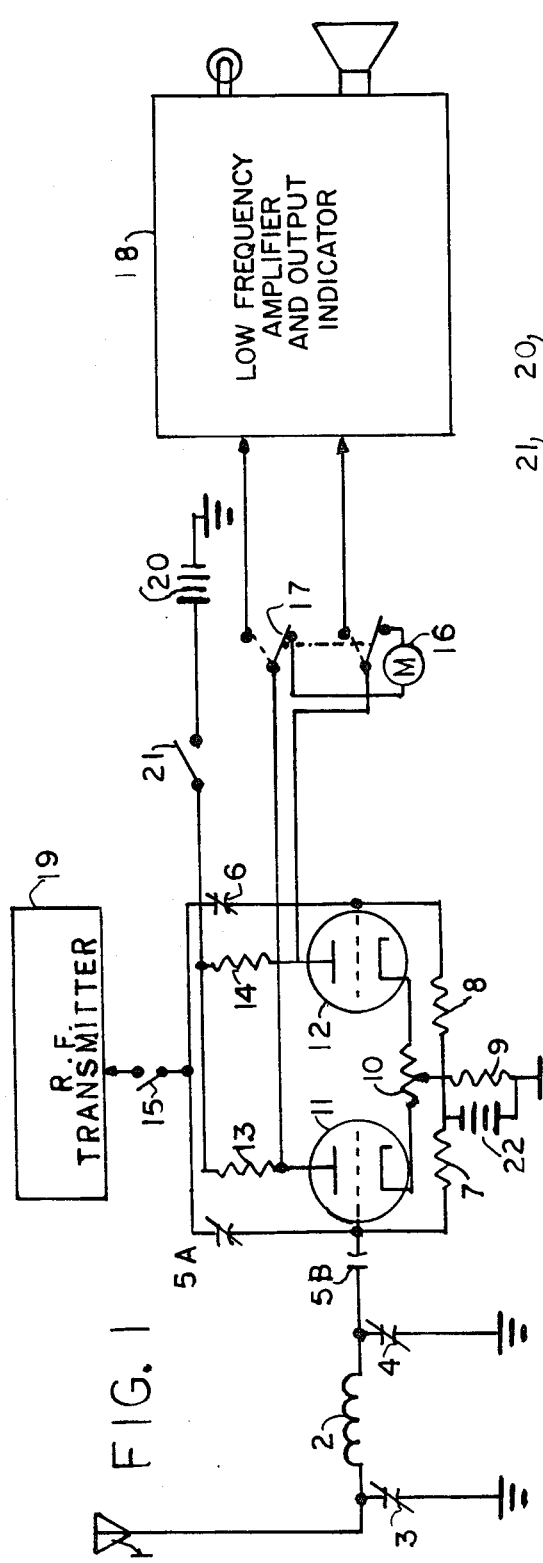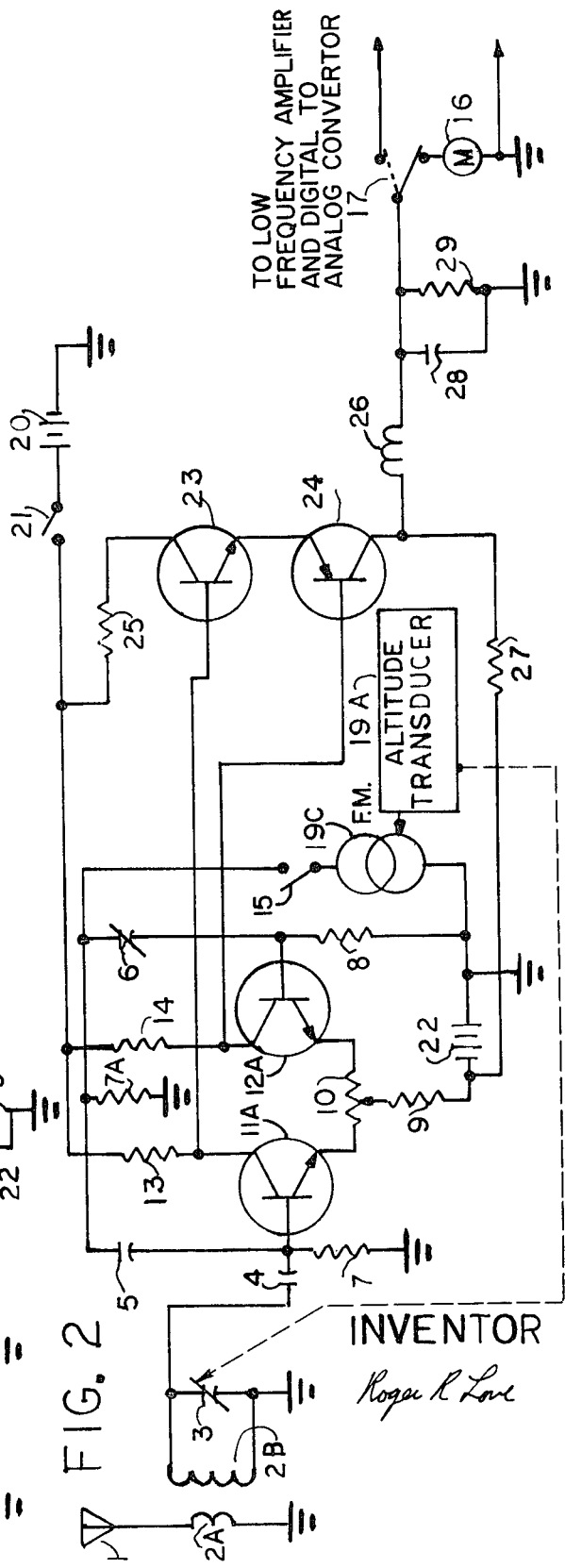

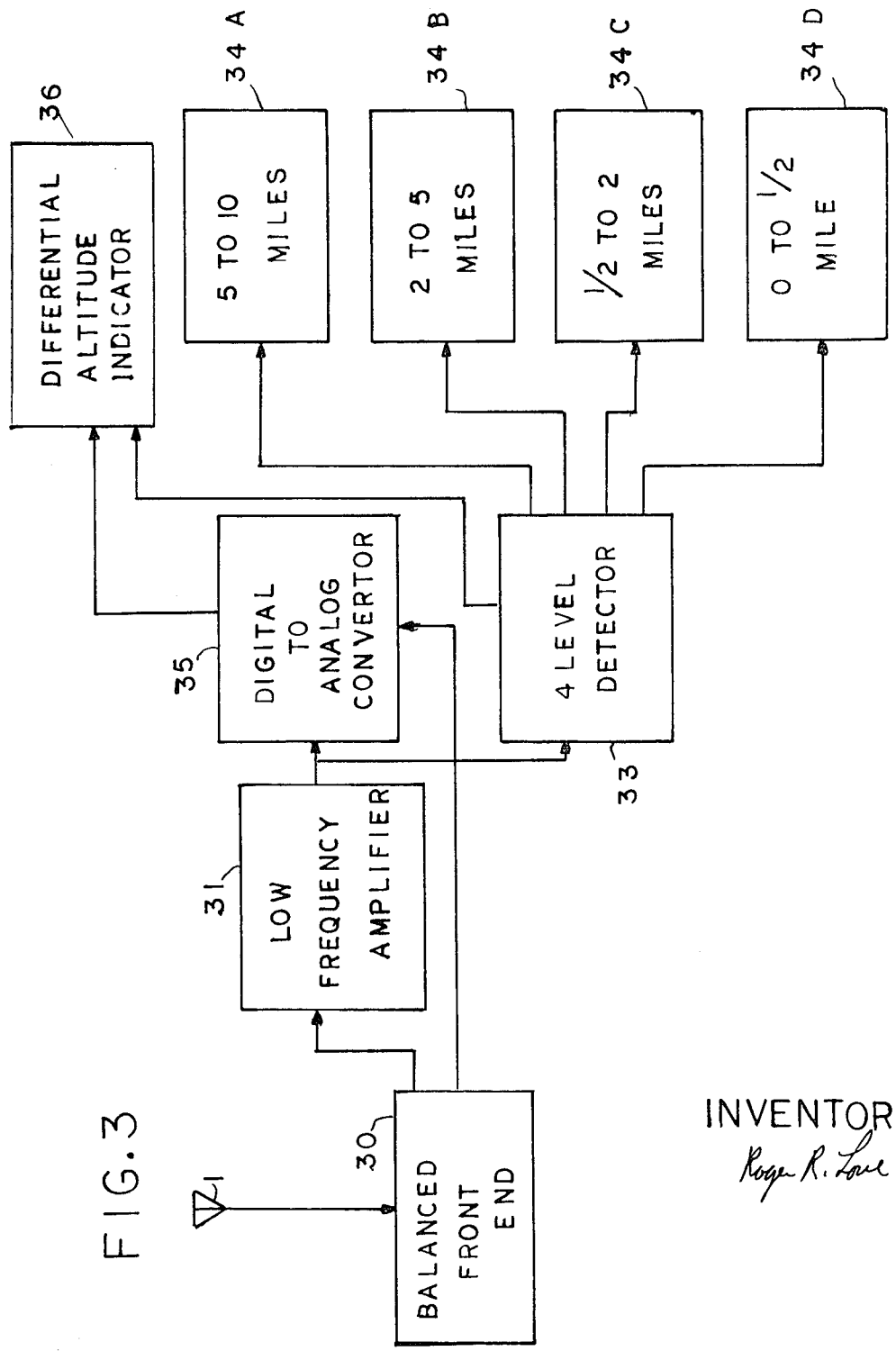

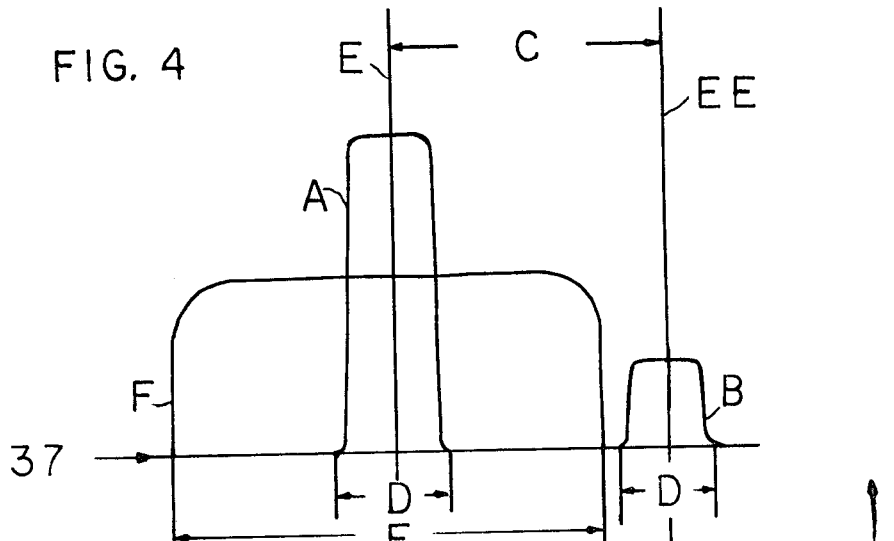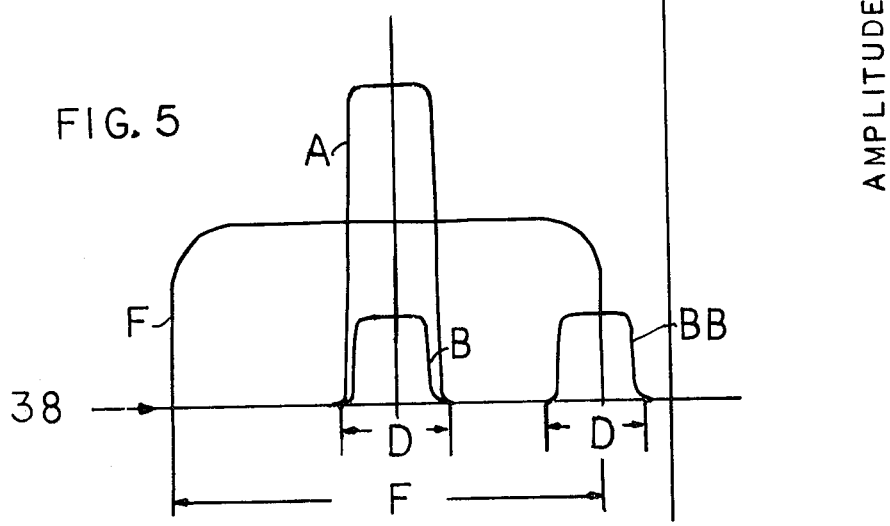
FREQUENCY INCREASE WITH ALTITUDE →
INVENTOR
Roger R. Love

FIG. 8 INPUT OUTPUT

TIME ⟶

INPUT ⟶ ⟶ OUTPUT

INVENTOR
Roger R. Love

PROXIMITY INDICATING MEANS

This invention relates to a device that will indicate the presence of a similar device located within a predetermined distance. The primary purpose of the said device, when installed in an aircraft, is to indicate audibly and/or visually, the approach or nearness of another aircraft equipped with a similar device. It is, essentially, a device intended to prevent possible air collisions caused by poor visibility and/or pilots' visual negligence.

FIG. 1 shows, in schematic diagram, the basic principle of the device using electronic tubes.

FIG. 2 shows the same device transistorized.

Figure 6:
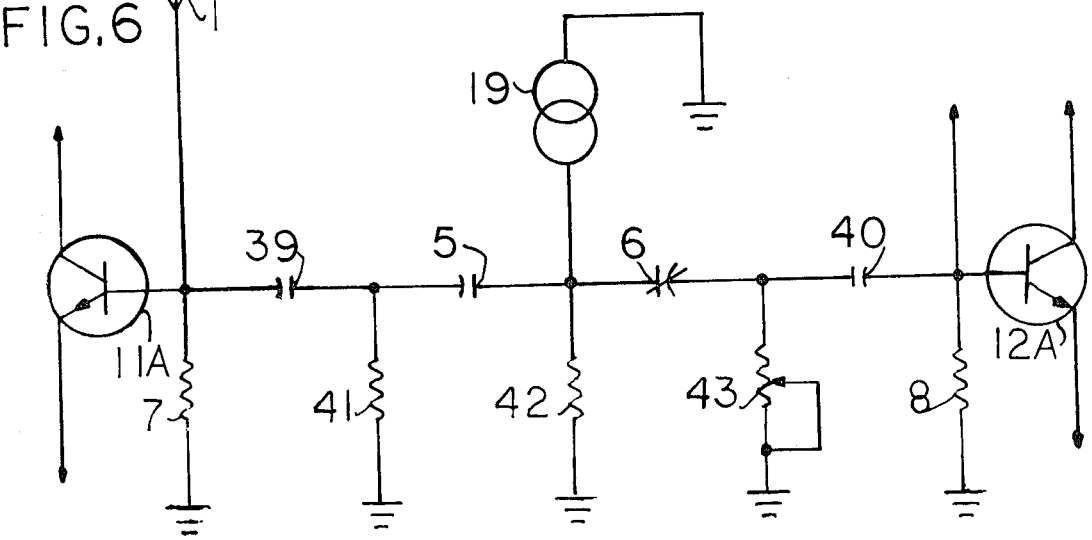

FIG. 3—8 inclusive, shown known means that can be combined with the said device to enhance its purpose.

The basic part of this invention comprises a radio frequency transmitter and receiver, combined as a transceiver, using a single common antenna, both transmitter and receiver being tuned to the same frequency and simultaneously in operation, the receiver having the unique ability of rejecting the relatively strong output of its own transmitter, but very responsive to the extremely weak signal from a distant similar transmitter.

This invention makes it possible that all the above can take place on the same frequency, and all receivers and transmitters can be continuously and simultaneously in operation. With every receiver being combined with a transmitter, receiver sensitivity and transmitter power, there can be a certain predetermined maximum distance between aircraft in which the reciver transmitter combination will receive the signal transmitted from the other aircraft having a similar device aboard. Whenever signals are first received, it will alert the pilots in both aircraft of their proximity to each other as being a certain specific distance. The device can function completely automatically without aid from the pilot or pilots, other than the primary tuning.

Although this invention is described herewith in terms of its services to flying machines, other applications of its basic principles will be obvious from the following description.

In the drawings — FIG. 1 is a part black diagram schematic drawing showing a wiring diagram of the device.

FIG. 2 shows the same device transistorized.

FIG. 3 shows, in block diagram, one possible combination of this invention with means heretofore known to the arts.

FIG. 4 shows, graphically, a radio frequency spectrum of transmitted and received signals.

FIG. 5 shows, graphically, a different radio frequency spectrum of transmitted and received signals.

FIG. 6 shows, in schematic, a phase shifting network.

Figure 7:
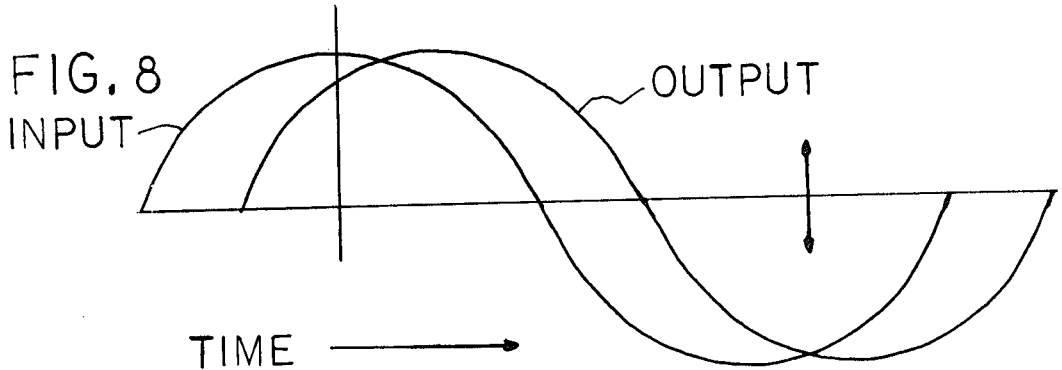

FIG. 7 shows, in schematic, one stage of the said phase shifting network.

FIG. 8 shows, graphically, the output relative to the input of such a stage.

FIG. 1 shows an antenna 1, an inductance 2, four variable capacitors 3, 4, 5A and 6 and one fixed capacitor 5B, two grid leak resistors 7 and 8, one cathode resistor 9, one potentiometer 10, a pair of vacuum tubes 11 and 12, a pair of similar plate load resistors 13 and 14, one on-and-off switch 15, a zero center volt or milliampere meter 16, a 2-circuit double throw switch 17, a low frequency detector and power amplifier providing an audio and/or visual indicating means 18, a radio frequency generating means 19, a direct current power source 20 with its on-and-off switch 21, and a grid bias power source 22.

The audio and/or visual indicating means 18 and the radio frequency generating means 19 may be of any type known to the arts, therefore, they are shown herewith in block diagram only. Both said block 18 and 19 appear in FIG. 1 only.

It will be noted that any plus voltage applied to the grid of the vacuum tube 11 will cause a greater amount of its plate current to flow. This extra said plate current will also pass through the common cathode resistor 9 increasing the voltage drop across it, thereby putting an increased plus voltage on the cathode relative to the grid of the vacuum tube 12, thereby reducing the plate current flow through the said vacuum tube 12, thus creating a voltage difference between the plates of the said vacuum tubes 11 and 12, this voltage difference being the source of the actuating means for the audio and/or visual indicating means 18. It will also be noted that when the same amount of radio frequency energy from the transmitter 19 is applied in the same magnitude and phase to the grids of each of the vacuum tubes 11 and 12 through capacitors 5A and 6, the influence of that said energy will be cancelled out and therefore cannot appear at the output 18.

In operation, with reference to FIG. 1, with switch 15 in the closed position and switch 21 in the open position, the transmitter's 19 output is tuned to the antenna at the desired frequency with the use of capacitors 3 and 4, with capacitor 5A, which may be fixed, and 5B serving as the transmitter's plate blocking capacitors when P*i* output is used. The closed switch 15 is then opened, disconnecting the radio frequency power source 19, and the B+ power source 20 applied by closing switch 21, and with the said dual switch 17 in the position shown, adjust the potentiometer 10 is adjusted until the zero center meter 16 reads zero. At this point, the said switch 15 is closed again, applying the said radio frequency power, which will probably throw the said zero center meter 16 offcenter Potentiometer 10 is adjusted again until the said zero center meter again comes to zero. When all the above is completed and the dual switch 17 thrown to the dotted line position, the device is ready for normal operation. At this point it can be observed that the device is balanced in such a manner that nothing can appear at the output 18 unless another source of energy is introduced through the antenna and tuning system to the grid of the first radio tube 11, thereby upsetting that precise balance, causing the output indicating means 18 to function due to the difference in potential between the plates of the said radio tubes 11 and 12. The zero center meter 16 alone could be used as an indicator.

FIG. 2 shows a transistorized version of the above, comprising an antenna 1, inductances 2A and 2B, two variable capacitors 3 and 6, three fixed capacitors 4, 5 and 8, two base resistors 7 and 8, one common emitter resistor 9, one phase shifting resistor 7A, one potentiometer 10, a pair of transistors 11A and 12A, a pair of collector load resistors 13 and 14, a power supply 20, an on-off switch 21, a pair of push-pull transistors 23 and 24, a load resistor 25, a frequency modulated radio frequency generating means 19C, an on-and-off switch 15, one collector output load resistor 27, one radio frequency choke 26, one output load resistor 29 bridged by the capacitor 28, a zero center meter 16, a transfer switch 17, and an altitude transducer 19A, hereinafter described.

In FIG. 2, the frequency modulated radio frequency transmitter section 19C is connected to both bases of the transistor 11A and 12A through capacitors 5 and 6 along with resistors 7 and 8 respectively, which make up a reactive, resistive divider, which by adjusting potentiometer 10 and variable capacitor 6 provides equal radio frequency voltages on each base. These equal RF voltages cause the bases to rise and fall above and below ground at the RF rate, which in turn causes the collector voltages to shift only slightly with respect to each other, due to the changes in the common emitter current from the said bases moving up and down past ground. This will provide an RF voltage at the base of transistor 11A which is coupled into the tuned antenna circuit through inductances 2A and 2B and capacitor 4. This RF voltage shows up on the antenna as transmitter power. Very little of the transmitter carrier power shows up as a differential signal on the floating output stage bases of transistors 23 and 24, theoretically none. Any low level transmitter voltage amplified by transistors 23 and 24 is attenuated by the band pass of an audio frequency amplifier stage (not shown), and the radio frequency choke 26 and capacitor 28. At this point on FIG. 2, it will be noted that the radio frequency voltages from the transmitter 19C is substantially nonexistant at the output indicating means 18, as shown in FIG. 1.

In operation, with reference to FIG. 2, the transistorized version is tuned similar to the vacuum tube version in FIG. 1.

The method of taking the signal from the collector load resistors 13 and 14, versus the vacuum tube plate resistors 13 and 14, is slightly different, using transistors 23 and 24 in a floating amplifier. These transistors amplify the output of the differential transistors 11A and 12A and apply the differential or recieved signal across the output load resistor 29. The final output could be used for driving a flashing light and/or an audio device similar to that described in the vacuum tube version, FIG. 1.

What is described and shown in the drawings primarily in FIG. 1, is the basic heart of this invention and will be known and termed hereinafter as "the balanced front end."

FIG. 3, shown in block diagram, comprises a group of nine blocks, each one of the said blocks containing approximately as follows:

Block 30 contains the "balanced front end" in its entirety primarily what is shown and described in FIG. 2, which contains the basic heart of this invention as applied to the various said blocks. What is shown and described in FIG. 1 alone, is in itself, a complete simple system for the purpose described.

Block 31 contains means to amplify the low level, low frequency signals coming out of the "balanced front end," these signals being raised to a level which is proper for injection into a four level detector (Block 33) and a digital to analogue converter (Block 35).

Block 33 contains the said four level detector, containing an analogue to digital converter which will detect sequentially an increasing analogue signal level with the decreasing distance of an approaching aircraft.

Blocks 34A, 34B, 34C, 34D contain the four level distance indicators, each being driven by one of the four different outputs from the said four level detector (Block 33).

Block 35 contains a digital to analogue converter to convert the differential frequency data coming from the low frequency amplifier (Block 31) to an analogue signal, this signal being of a level proper to drive a differential altitude indicator (Block 36). The signal output from the low frequency amplifier is also used to unlock the four level detector (Block 33) for indications when the approaching aircraft is within a 2000-ft. altitude band.

Block 36 contains a differential altitude indicating means, providing visual indications of whether the approaching aircraft is within a prescribed altitude band and by how much.

The above description of the block diagrams as shown in FIG. 3, is merely to show one of the many possible combinations of known means that can be combined with this invention as shown in FIG. 1 and FIG. 2 and disclosed in the specifications and termed the "balanced front end."

FIG. 4 shows, graphically, a radio frequency spectrum of the outgoing and incoming signals A and B respectively, based on a frequency differential c of 1 Hz./ 1 ft. of altitude with 1000 ft. vertical separation, all transmitted signals being frequency modulated 20 Hz. as represented by D, FIGS. 4 and 5. The said 1000 ft. vertical separation, either above or below, also the stated 10 mile range and the bandwidth of the said frequency modulated signals, are arbitrary amounts arrived at for the sake of this application.

The altitude transducer 19A, heretofore mentioned, is a means to change the trasmitter's frequency with altitude, which is accomplished by means of a barometric pressure controlled device so designed that the frequency would increase with altitude, and also that at and beyond 1000 ft. vertical separation, the frequency would change to the extent that it would be outside and beyond the band width of the reciever. This distance is determined by the amount of transmitter frequency change per altitude and the band width of the receiver. The above said frequency changing means, which is already known to the arts, shall be known hereinafter and especially in the claims, as an attitude transducer.

Further in FIG. 4, the upper graph 37 shows the low level incoming signal B and its center frequency's EE relationship to that of the receiver's band width F, with 1000 ft. vertical separation C. Under these conditions, it will be noted that the incoming signal's frequency is sufficiently outside and beyond the scope of the receiver's band width that reception would be impossible although both aircraft may be slightly more than 1000 ft. apart vertically. If the same approaching aircraft Would be at the same altitude, reception would begin to take place at a distance of 10 miles or some other predetermined distance as both transmitter and receiver would then be on the same frequency.

FIG. 5 shows a radio frequency spectrum based on a frequency differential of 1 Hz./1 ft. of altitude with zero feet vertical separation. Graph 38 shows a spectrum of RF voltages appearing on the antenna of the "balanced front end" with an approaching aircraft at exactly the same altitude, E being the center frequency of both transmitters and receivers, A being the high level outgoing signal and B the approaching aircraft's low level incoming signal. Under these conditions it will be noted that the low level incoming signal's frequency is completely within the scope of the receiver's band width E, making reception possible. It will be further noted that the said low level incoming signal becomes effective as soon as any portion of it enters the scope of the receiver's bandwidth, which is shown as BB in FIG. 5.

It will be noted that the input/output tuning system 2, 3 and 4, as shown in FIG. 1 and 2A, 2B and 3 as shown in FIG. 2 are common types. Many other forms would work with equal success, and as any one of the types shown in the drawings may not be the one used in the final prototype, the input/output tuning means shall be known in the claims as an "inductive capacity tuning means," and the combined unit herewith disclosed and shown in FIG. 1 and FIG. 2 shall be known in the claims as the "balanced front end" as mentioned heretofore. The device can function equally as well with either radio tubes or transistors, so the end results must be considered synonymous.

A further study of FIG. 1 and FIG. 2 will show that the incoming signal from the antenna 1 is, relatively, directly connected to the grid of the input tube 11 with respect to the grid of tube 12. The same also applies to the transistors 11 and 12, FIG. 2. A small amount of the said incoming signal will reach the said grid of the said tube 12 through capacitors 5A and 6 thereby causing a slight cancellation of the incoming signal causing reduced sensitivity of the device as a receiver. Although what is shown in FIG. 1 is in itself a practical workable means, it can be enhanced by a phase shifting resistor capacitor network capable of reversing the phase of the signal that reaches the grid of tube 12 with respect to the grid of the input tube 11, thereby augmenting rather than diminishing the sensitivity of the device as a receiver. FIG. 6 shows, in schematic, such a network. It comprises four capacitors 39, 5, 6 and 40 and three resistors 41, 42, and a variable resistor 43. FIG. 7 shows a single capacitor resistor combination capable of shifting the phase of the alternating current output 45° with respect to the input. FIG. 8 shows, graphically, the phase relationship of such an arrangement, which is well-known to the arts.

In operation, with the phase shifting means FIG. 6 incorporated in the device, the procedure is the same as heretofore described with the exception that when the transmitter power is balanced on the grids of tubes 11 and 12 or the bases of the transistors 11A and 12A by the variable capacitor 6, some slight adjustment of the variable resistor 43 may be necessary. Only one adjustment is required so a fixed resistor of the proper value may be permanently connected, replacing the said variable resistor 43. It must be understood that although a four stage phase shifting network is herein described, a lesser number could suffice. What is shown in FIGS. 6, 7 and 8 and described above, shall be known and termed in the claims as a "phase shifting means."

As the above being one specific embodiment of this invention, many other embodiments can be used with equal success, and the above described "balanced front end" can be combined with many principles and means heretofore known to the arts.

I claim:
1. In an electronic indicating device for the purpose described, a frequency modulated radio frequency transmitter and a radio frequency receiver, said transmitter and receiver having at least one common transmitting and receiving antenna and inductive capacity tuning means, said reciever having the ability to reject the relatively strong signal from its own transmitter, yet able to detect and receive the relatively weak signal from a distant similar transmitter, said device having the ability to audibly and visually indicate the presence of the source of the said relatively weak signal from the said distant similar transmitter, all receivers and transmitters being in simultaneous operation and on the same frequency.

2. In an electronic indicating device for the purpose described as in claim 1 wherein the said device includes a means to vary the fundamental frequency of the modulated radio frequency transmitter by changes in barometric pressure, the output of the said modulated radio frequency transmitter being adapted to actuate an electronic amplifying means, said electronic amplifying means being adapted to actuate a digital to analogue converter and a detecting means for a various distance indicating means and a differential altitude indicating means.

3. In a device for the purpose described, a combined radio frequency transmitter and reciever, said receiver having the ability to reject the relatively strong signal from the said transmitter, but capable of receiving a relatively weak signal from a distant similar transmitter on the same frequency, the said transmitter and receiver functioning simultaneously through, at least, one common antenna and one inductive capacity tuning means, said device being capable of audibly and visually indicating the presence of the source of the said relatively weak signal from the said distant similar transmitter.

4. In a device for the purpose described as in claim 3, wherein the said device includes a frequency changing means relative to changes in barometric pressure and means to amplify the output of the said device, said output being adapted to actuate a digital to analogue converting means and a detecting means for various distance indicators and a differential altitude indicating means.

5. In a proximity indicating device of the type described, an antenna connected to an inductive capacity input and output tuning means, said inductive capacity input and output tuning means being the input and output of a radio frequency transceiver, said radio frequency transceiver embodying a radio frequency generating source, said radio frequency generating source being connected to the respective grids of a plurality of vacuum tubes, a capacitive means to equalize the radio frequency power applied to the respective grids of the said plurality of vacuum tubes, said plurality of vacuum tubes each having its own independent plate load resistor and a common cathode resistor plus a plate current equalizing potentiometer connected between the respective cathodes of the said plurality of vacuum tubes, a visual tuning and balance indicator connected to the output of the said plurality of vacuum tubes, means to switch from the said visual tuning and balancing indicator to a final output indicating means and a direct current power source applied to the said plurality of vacuum tubes.

6. In a proximity indicating device of the type described as in claim 5 wherein the said device includes an altitude transducer connected to and functioning with respect to the inductive capacity input and output tuning means and the radio frequency generating source, an electronic amplifying means connected to the output of the said device, said electronic amplifying means being capable of transferring the signal to a digital to analogue converter and various level detecting means, thence to a plurality of different distance indicators and a differential altitude indicating means.

7. In a device of the class described, an antenna with an inductive capacity input and output tuning means connected thereto, said input and output tuning means being the input and output of a radio frequency transceiver, said radio frequency transceiver embodying a pair of vacuum tubes, each one of the said vacuum tubes having at least three elements, said vacuum tubes being in separate and parallel circuits, each one of the said parallel circuits having its own independent plate load resistor and a common cathode resistor functioning in, and with respect to both parallel circuits, a potentiometer connected between the cathodes of the said vacuum tubes with its variable midpoint connected to the said common cathode resistor, the said potentiometer being a means to equalize the plate current flow in each of the said vacuum tubes, a radio frequency generating means connected to each of the grids of the said vacuum tubes through different and independent variable capacitors, said variable capacitors being a radio frequency balancing means as applied to the respective grids of each of the said vacuum tubes, a differential tuning and balance indicating meter connected to the output of the said pair of vacuum tubes, a switching means from the said differential tuning and balance indicating meter to an output indicating means, a plate power source and a grid bias power source applied to the said pair of vacuum tubes.

8. In combination in a device for the purpose described, an antenna connected to an inductive capacity input and output tuning means, said inductive capacity input and output tuning means being the input and output of a radio frequency transceiver, said radio frequency transceiver embodying a first pair of transistors, each one of the said first pair of transistors being in separate and parallel circuits, each one of the said parallel circuits having its own collector load resistor and a common emitter resistor, functioning in, and with respect to both said parallel circuits, a potentiometer connected between the emitters of the said first transistors with its variable midpoint connected to the said common emitter resistor, said potentiometer being a means to equalize the collector current flow in each of the said first transistors, a frequency modulated radio frequency generating means connected to the base of each one of the said first transistors through different and independent capacitors, at least one being variable, said independent capacitors being a radio frequency balancing means as applied to the bases of each one of the said first transistors, a second pair of transistors in a floating amplifier stage connected to the output of the said first pair of transistors thence to a differential visual balance and tuning indicator with means to switch from the said differential visual balance and tuning indicator to a final output indicating means, and a direct current power source applied to all transistors.

9. In combination in a device for the purpose described, as in claim 8 wherein the said device includes an altitude transducer connected to and functioning with respect to the inductive capacity input and output tuning means and the frequency modulated radio frequency generating means, an electronic amplifying means connected to the output of the said device, said electronic amplifying means being capable of transferring the signal to a digital to analogue converter and various level detecting means thence to a plurality of different distance indicators and a differential altitude indicating means.

10. In combination in a device for the purpose described, an antenna connected to an inductive capacity input and output tuning means, said inductive capacity input and output tuning means being the input and output of a radio frequency transceiver, said radio frequency transceiver embodying, at least, a first pair of transistors, each one of the said first transistors being in separate and parallel circuits, each one of the said parallel circuits having its own collector load resistor and sharing a common emitter resistor functioning in, and with respect to both said parallel circuits, a potentiometer connected between the emitters of the said first transistors with its variable midpoint connected to the said common emitter resistor, said potentiometer being a means to equalize the collector current flow in each of the said transistors, a phase shifting means connected between the bases of the said first transistors, a frequency modulated radio frequency generating means connected to the base of each one of the said first transistors through a plurality of capacitors, at least one being variable, part of the said plurality of capacitors serving as part of the said phase shifting means, a capacitive radio frequency balancing means as applied to the bases of each one of the said first transistors, a second pair of transistors in a floating amplifier stage connected to the output of the said first transistors thence to a differential visual balance and tuning indicator with means to switch from the said differential visual balance and tuning means to a final output indicating means, an altitude transducer functioning with respect to the said frequency modulated radio frequency means and the said inductive capacity input and output tuning means, and a direct current power source applied to all transistors.

11. In combination in a device for the purpose described as in claim 10 wherein the said device includes an electronic amplifying means connected to the output of the second pair of transistors forming the floating amplifier, said electronic amplifying means transferring the signal to a digital to analogue converter and a various level detecting means, thence to a plurality of different distance indicating means and a differential altitude indicating means.

12. In a device for the purpose described, an antenna with at least one inductive capacity tuning input and output means connected thereto, said inductive capacity tuning input and output means being the input and output of a radio frequency transceiver, said radio frequency transceiver embodying a pair of similar vacuum tubes, each one of the said similar vacuum tubes having at least three elements, said similar vacuum tubes being in separate and parallel circuits, each one of the said parallel circuits having its own independent plate load resistor and a common cathode resistor functioning in and with respect to both said circuits, a potentiometer connected between the respective cathodes of each of the said similar vacuum tubes with its variable midpoint connected to the said common cathode resistor, the said potentiometer being a means to equalize the plate current flow in each of the said vacuum tubes, a radio frequency generating means connected to the respective grids of each of the said similar vacuum tubes through different and independent variable capacitors, said variable capacitors being a radio frequency balancing means as applied to the respective grids of each of the said similar vacuum tubes, a differential visual tuning and balance indicating means connected to the output of the said pair of similar vacuum tubes, a switching means from the said differential visual tuning and balance indicating means to, at least, one output indicating means, a plate power supply source and a grid bias power source applied to the said pair of similar vacuum tubes.

13. In combination in a device for the purpose described, said device having at least one transmitting and receiving antenna, said antenna being connected to, at least, on inductive capacity radio frequency tuning input and output means, said input and output means being the input and output of a radio frequency transceiver, said radio frequency transceiver embodying a pair of similar vacuum tubes and plate load resistors, each one of the said vacuum tubes having a common cathode resistor and a potentiometer connected from cathode to cathode of the said vacuum tubes with its variable center point connected to the said common cathode resistor, said potentiometer being a means to equalize the plate current flow in each of the said vacuum tubes, a radio frequency generating means connected to the grids of each of the said vacuum tubes through different and independent variable capacitors, said variable capacitors being capable of equalizing the amount of radio frequency energy applied to the respective grids of each of the said vacuum tubes, a zero center balancing and tuning meter connected to the output of the said vacuum tubes with means to switch from the said zero center balancing and tuning meter to a final output indicating means, a B+ and a C− power source applied to the said similar vacuum tubes.

UNITED STATES PATENT OFFICE
CERTIFICATE OF CORRECTION

Patent No. 3,569,968   Dated March 9, 1971

Inventor(s) Roger Ross Love

It is certified that error appears in the above-identified patent and that said Letters Patent are hereby corrected as shown below:

On the cover sheet [56] References Cited UNITED STATES PATENTS beginning with "524,994   8/1894   Allen ..... 112/149" cancel all to and including "2,827,867   3/1958   Happe .....   112/218X".

Signed and sealed this 24th day of October 1972.

(SEAL)
Attest:

EDWARD M. FLETCHER, JR.
Attesting Officer

ROBERT GOTTSCHALK
Commissioner of Patent

FORM PO-1050 (10-69)